United States Patent
Chou et al.

(10) Patent No.: US 10,469,821 B2
(45) Date of Patent: Nov. 5, 2019

(54) STEREO IMAGE GENERATING METHOD AND ELECTRONIC APPARATUS UTILIZING THE METHOD

(71) Applicant: Altek Semiconductor Corp., Hsinchu (TW)

(72) Inventors: Hong-Long Chou, Hsinchu (TW); Su Ian Alias Eugene Lei, Hsinchu (TW)

(73) Assignee: Altek Semiconductor Corp., Hsinchu (TW)

(*) Notice: Subject to any disclaimer, the term of this patent is extended or adjusted under 35 U.S.C. 154(b) by 380 days.

(21) Appl. No.: 15/369,906

(22) Filed: Dec. 6, 2016

(65) Prior Publication Data

US 2017/0366795 A1 Dec. 21, 2017

Related U.S. Application Data

(60) Provisional application No. 62/351,307, filed on Jun. 17, 2016.

(30) Foreign Application Priority Data

Sep. 28, 2016 (TW) .............................. 105131125 A

(51) Int. Cl.
*H04N 13/128* (2018.01)
*H04N 13/271* (2018.01)
(Continued)

(52) U.S. Cl.
CPC ........... *H04N 13/128* (2018.05); *G06T 7/593* (2017.01); *H04N 13/239* (2018.05); *H04N 13/25* (2018.05);
(Continued)

(58) Field of Classification Search
None
See application file for complete search history.

(56) References Cited

U.S. PATENT DOCUMENTS 8,619,082 B1 * 12/2013 Ciurea ................. H04N 13/232
345/427
9,424,650 B2 * 8/2016 van Baar .............. G06T 7/0075
(Continued)

FOREIGN PATENT DOCUMENTS

CN 102760234 10/2012
TW 200841704 10/2008

OTHER PUBLICATIONS

"Office Action of Taiwan Counterpart Application," dated Jul. 13, 2017, p. 1-7, in which the listed references were cited.

*Primary Examiner* — Gelek W Topgyal
(74) *Attorney, Agent, or Firm* — JCIPRNET

(57) ABSTRACT

A stereo image generating method and an electronic apparatus utilizing the method are provided. The electronic apparatus includes a first camera and a second camera capable of capturing stereo images, and a resolution of the first camera is larger than that of the second camera. In the method, a first image is captured by the first camera, and a second image is captured by the second camera. The second image is upscaled to the resolution of the first camera, and a depth map is generated with use of the first image and the upscaled second image. With reference to the depth map, the first image is re-projected to reconstruct a reference image of the second image. An occlusion region in the reference image is detected and compensated by using the upscaled second image. A stereo image including the first image and the compensated reference image is generated.

12 Claims, 9 Drawing Sheets

(51) Int. Cl.
  *H04N 13/31*     (2018.01)
  *H04N 13/383*    (2018.01)
  *H04N 13/398*    (2018.01)
  *G06T 7/593*     (2017.01)
  *H04N 13/239*    (2018.01)
  *H04N 13/25*     (2018.01)
  *H04N 13/00*     (2018.01)

(52) U.S. Cl.
  CPC ........... *H04N 13/271* (2018.05); *H04N 13/31* (2018.05); *H04N 13/383* (2018.05); *H04N 13/398* (2018.05); *H04N 2013/0081* (2013.01)

(56) References Cited

U.S. PATENT DOCUMENTS

| | | | |
|---|---|---|---|
| 2007/0189599 A1* | 8/2007 | Ryu | G06K 9/46 382/154 |
| 2009/0116732 A1* | 5/2009 | Zhou | H04N 13/139 382/154 |
| 2009/0315982 A1* | 12/2009 | Schmidt | H04N 13/395 348/47 |
| 2012/0075419 A1 | 3/2012 | Boisson et al. | |
| 2012/0206573 A1* | 8/2012 | Dokor | H04N 13/271 348/46 |
| 2012/0262553 A1* | 10/2012 | Chen | G01B 11/25 348/47 |
| 2013/0051660 A1* | 2/2013 | Shibuhisa | H04N 13/261 382/154 |
| 2014/0055621 A1* | 2/2014 | Shirani | H04N 7/18 348/159 |
| 2015/0245062 A1* | 8/2015 | Shimizu | H04N 19/597 375/240.15 |
| 2016/0337635 A1* | 11/2016 | Nisenzon | H04N 13/271 |

\* cited by examiner

STEREO IMAGE GENERATING METHOD AND ELECTRONIC APPARATUS UTILIZING THE METHOD

CROSS-REFERENCE TO RELATED APPLICATION

This application claims the priority benefits of U.S. provisional application Ser. No. 62/351,307, filed on Jun. 17, 2016, and Taiwan application serial no. 105131125, filed on Sep. 28, 2016. The entirety of each of the above-mentioned patent applications is hereby incorporated by reference herein and made a part of this specification.

FIELD OF THE INVENTION

The invention relates to an image processing method and an image processing apparatus; more particularly, the invention relates to a stereo image generating method and an electronic apparatus utilizing the method.

DESCRIPTION OF RELATED ART

With the advancement of image capturing techniques, pixels of digital cameras are significantly increased, while the dimension of the cameras are relatively decreased; therefore, these cameras can be arranged on mobile phones, tablet PCs, and other portable electronic apparatuses, such that users are allowed to capture images at anytime and anywhere. In the current market, some mobile phones are equipped with duel-lens cameras, whereby images may be taken at left-eye and right-eye view angles, so as to generate stereo images for the users to observe. Besides, according to disparity between corresponding objects in the left-eye and right-eye images, the cameras are able to further calculate depth information of each object in the images. Such depth information may be applied to perform an object detecting function, a depth of field (DOF) adjusting function, a focal length switching function, and other advanced functions, so as to expand fields where the cameras can be applied.

However, if dual lenses with the same specification are arranged on a camera, the costs will be doubled, which leads to a significant increase in the costs of the apparatuses having the dual-lens camera. Hence, such issues as how to achieve the aforesaid functions that can be accomplished by the dual-lens camera and simultaneously minimize the costs are to be resolved by people skilled in the pertinent art.

SUMMARY OF THE INVENTION

The invention provides an electronic apparatus and a stereo image generating method utilized by the electronic apparatus, wherein images taken by a high-resolution camera and a low-resolution camera are processed to generate stereo images with high revolutions.

In an embodiment of the invention, a stereo image generating method is adapted to an electronic apparatus that includes a first camera and a second camera. The first camera and the second camera are capable of capturing stereo images, and a resolution of the first camera is larger than a resolution of the second camera. In the method, a first image is captured by the first camera, and a second image is captured by the second camera. The second image is upscaled to the resolution of the first camera, and a depth map is generated with use of the first image and the upscaled second image. With reference to the depth map, the first image is re-projected to reconstruct a reference image of the second image. An occlusion region in the reference image is detected and compensated by using the upscaled second image. A stereo image including the first image and the compensated reference image is generated.

According to an embodiment of the invention, the step of re-projecting the first image to reconstruct the reference image of the second image further includes obtaining disparity information between the first image and the reference image of the second image with reference to depth information in the depth map and a baseline distance between the first camera and the second camera and re-projecting the first image in a three-dimensional space with the disparity information, so as to reconstruct the reference image of the second image.

According to an embodiment of the invention, the step of re-projecting the first image to reconstruct the reference image of the second image further includes detecting a distance between two eyes of a user of the electronic apparatus, calculating an adjusted value of a baseline distance between the first camera and the second camera according to the distance between the two eyes of the user and the baseline distance between the first camera and the second camera, and re-projecting the first image with reference to the depth map and the adjusted value of the baseline distance to reconstruct the reference image of the second image, such that the disparity information between the first image and the reference image of the second image complies with the distance between the two eyes of the user.

According to an embodiment of the invention, the step of re-projecting the first image with reference to the depth map and the adjusted value of the baseline distance to reconstruct the reference image of the second image includes adjusting a parallax between the first image and the second image according to the adjusted value of the baseline distance, capturing depth information in the depth map and converting a coordinate system of a coordinate of the depth information into a world coordinate system, and re-projecting the first image according to the converted depth information and the adjusted parallax, so as to reconstruct the reference image of the second image.

According to an embodiment of the invention, the step of detecting the occlusion region in the reference image includes matching the reference image with the upscaled second image and taking a region of the reference image not matched with the upscaled second image as the occlusion region.

According to an embodiment of the invention, the step of detecting the occlusion region in the reference image includes detecting a blank region in the reference image and taking the blank region as the occlusion region.

According to an embodiment of the invention, after detecting the occlusion region in the reference image and compensating the occlusion region by using the upscaled second image, the method further includes detecting main objects respectively in the first image and the second image and adjusting disparity information between the first image and the reference image of the second image, such that the main objects are concentrated onto a display plane of the electronic apparatus.

In an embodiment of the invention, an electronic apparatus that includes a first camera, a second camera, and an image processing circuit is provided. The image processing circuit is coupled to the first camera and the second camera and configured to process a first image and a second image respectively captured by the first camera and the second camera. The image processing circuit includes a resolution upscaling module, a depth generating module, an image reconstructing module, an occlusion region detecting module, an occlusion region compensating module, and a stereo image generating module. The first camera and the second camera are respectively configured to capture one of left-eye and right-eye images required for generating a stereo image, wherein a resolution of the first camera is greater than a resolution of the second camera. The resolution upscaling module is configured to upscale the second image to the resolution of the first camera. The depth generating module is configured to generate a depth map with use of the first image and the upscaled second image. The image reconstructing module is configured to re-project the first image with reference to the depth map, so as to reconstruct a reference image of the second image. The occlusion region detecting module is configured to detect an occlusion region in the reference image, and the occlusion region compensating module is configured to compensate the occlusion region by using the upscaled second image. The stereo image generating module is configured to generate the stereo image including the first image and the compensated reference image.

According to an embodiment of the invention, the image reconstructing module obtains disparity information between the first image and the reference image of the second image with reference to depth information in the depth map and a baseline distance between the first camera and the second camera and re-projects the first image in a three-dimensional space with the disparity information, so as to reconstruct the reference image of the second image.

According to an embodiment of the invention, the image processing module further includes an eye distance detecting module that is configured to detect a distance between two eyes of a user of the electronic apparatus. The image reconstructing module calculates an adjusted value of a baseline distance between the first camera and the second camera according to the distance between the two eyes of the user and the baseline distance between the first camera and the second camera and re-projects the first image with reference to the depth map and the adjusted value of the baseline distance to reconstruct the reference image of the second image, such that the disparity information between the first image and the reference image of the second image complies with the distance between the two eyes of the user.

According to an embodiment of the invention, the image reconstructing module further adjusts a parallax between the first image and the second image according to the adjusted value of the baseline distance, retrieves depth information in the depth map and converts a coordinate system of a coordinate of the depth information into a world coordinate system, and re-projects the first image according to the converted depth information and the adjusted parallax, so as to reconstruct the reference image of the second image.

According to an embodiment of the invention, the occlusion region detecting module matches the reference image with the upscaled second image and takes a region of the reference image not matched with the upscaled second image as the occlusion region.

According to an embodiment of the invention, the occlusion region detecting module detects a blank region in the reference image and takes the blank region as the occlusion region.

According to an embodiment of the invention, the image processing circuit further includes an object detecting module and a disparity adjusting module. The object detecting module is configured to detect a main object in the first image and a main object in the second image. The disparity adjusting module is configured to adjust disparity information between the first image and the reference image of the second image, such that the main objects are concentrated onto a display plane of the electronic apparatus.

In view of the above, in the electronic apparatus and its stereo image generating method, the image captured by a low-resolution camera is upscaled and is then combined with the image captured by a high-resolution camera, so as to calculate the depth map of the image and accordingly reconstruct the high-resolution reference image corresponding to the image captured by the low-resolution camera. The reference image can be combined with the high-resolution image captured by the high-resolution camera, so as to generate high-resolution stereo images.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF EMBODIMENTS

In the invention, a low-resolution camera and a high-resolution camera are collectively used to reduce costs. Here, an image captured by the high-resolution camera is employed to reconstruct an image captured by the low-resolution camera, and an occlusion region in the reconstructed image is compensated with use of the low-resolution image captured by the low-resolution camera. Eternally, the reconstructed image and the image captured by the high-resolution camera are combined to generate a high-resolution stereo image. In the invention, a distance between two eyes of a user of the electronic apparatus is further detected, so as to adjust a baseline distance of the cameras and accordingly reconstruct the image taken by the low-resolution camera. As such, the disparity information between the reconstructed image and the image taken by the high-resolution camera complies with the distance between the two eyes of the user, and the generated stereo image is suitable for the user to observe.

Figure 1:
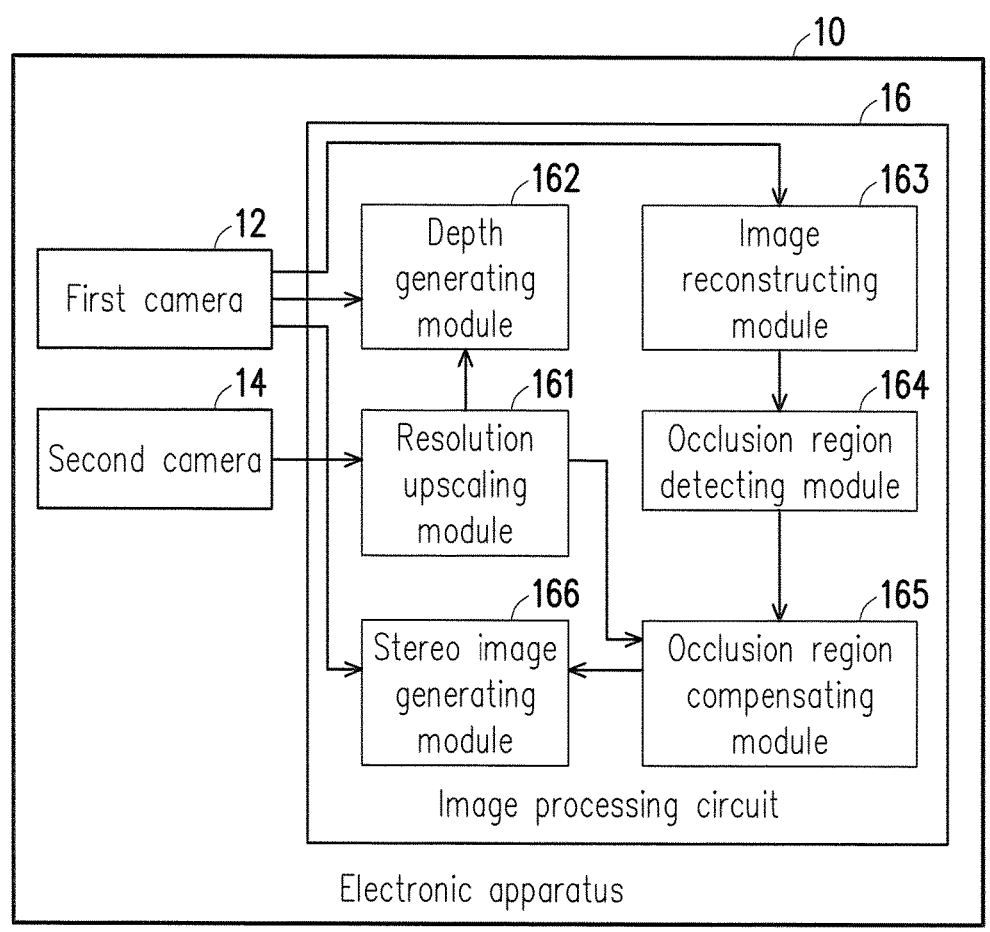
FIG. 1 is a block diagram showing an electronic apparatus according to an embodiment of the invention.

FIG. 1 is a block diagram showing the electronic apparatus according to an embodiment of the invention. With reference to FIG. 1, the electronic apparatus 10 provided in the present embodiment is, for instance, a digital camera, a digital video camcorder (DVC), or a portable electronic apparatus capable of performing an image taking function, such as a mobile phone, or a tablet PC. The electronic apparatus 10 includes a first camera 12, a second camera 14, and an image processing circuit 16, and the functions thereof are provided hereinafter.

The first camera 12 and the second camera 14 respectively include an optical lens, an actuator, an aperture, a shutter, an image sensor, and so on. The optical lens is composed of several concave-convex lenses and driven by a stepping motor, a voice coil motor (VCM), or another actuator, so as to change the relative locations of the lenses and further change the focal length of the camera. The shutter is configured to control the length of time during which light enters the camera, and the combination of the shutter and the aperture decides the exposure amount of the image captured by the image sensor. The image sensor is equipped with a charge coupled device (CCD), a complementary metal-oxide semiconductor (CMOS), or any other photo-sensing device for sensing the intensity of light entering the optical lens and thus generating the image. In the present embodiment, the first camera 12 and the second camera 14 are respectively configured to capture one of left-eye and right-eye images required for generating a stereo image, wherein a resolution of the first camera 12 is greater than a resolution of the second camera 14.

The image processing circuit 16 includes a resolution upscaling module 161, a depth generating module 162, an image reconstructing module 163, an occlusion region detecting module 164, an occlusion region compensating module 165, and a stereo image generating module 166. In an embodiment of the invention, each module in the image processing circuit 16 is implemented in form of integrated circuits (IC), so as to achieve the stereo image generating method provided in the present embodiment. In another embodiment of the invention, the image processing circuit 16 includes a storage apparatus and a processor, for instance. The storage apparatus is, for instance, a central processing unit (CPU), a microprocessor, a digital signal processor (DSP), a programmable controller, an application specific integrated circuit (ASIC), a programmable logic device (PLD), or other hardware devices with computing capabilities. Each module in the image processing circuit 16 is, for instance, computer programs stored in the storage apparatus. These programs may be loaded by the processor to execute the stereo image generating method provided in the present embodiment.

Figure 2:
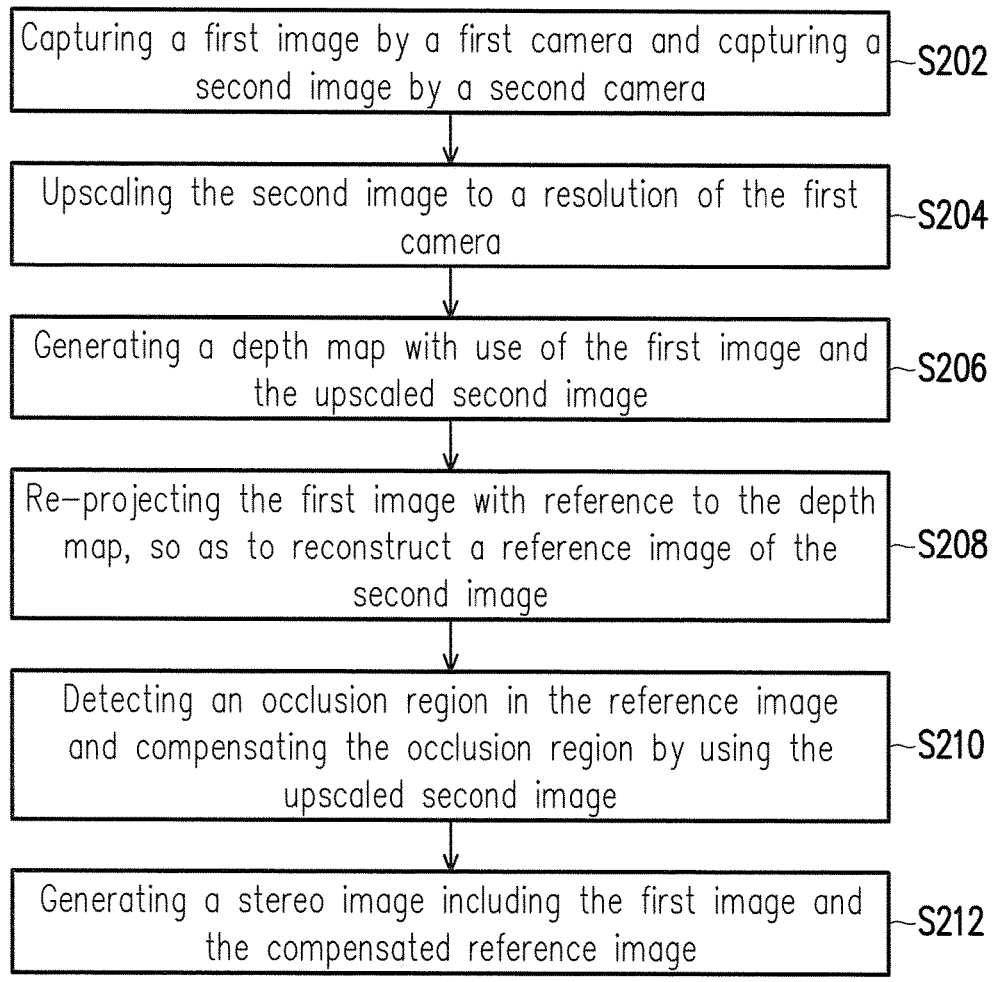
FIG. 2 is a flowchart illustrating a stereo image generating method of an electronic apparatus according to an embodiment of the invention.

Specifically, FIG. 2 is a flowchart illustrating a stereo image generating method of an electronic apparatus according to an embodiment of the invention. With reference to FIG. 1 and FIG. 2, the method provided in the present embodiment is adapted to the electronic apparatus 10 depicted in FIG. 1. Detailed steps of the stereo image generating method provided in this embodiment are explained below with reference to the components in the electronic apparatus 10 shown in FIG. 1.

A first image is captured by the first camera 12, and a second image is captured by the second camera 14 (step S202). In the electronic apparatus 10, after the user presses the shutter button, the first camera 12 and the second camera 14 are simultaneously triggered to capture the images.

The resolution upscaling module 161 then upscales the second image captured by the second camera 14 to the resolution of the first camera 12 (step S204). Here, the resolution upscaling module 161 upscales the low-resolution second image to the high-resolution first image through interpolation, for instance. Namely, the dimension of the upscaled second image is the same as the dimension of the first image.

The second image upscaled by the resolution upscaling module 161 and the first image captured by the first camera 12 are together transmitted to the depth generating module 162, and the depth generating module 162 generates a depth map with use of the first image and the upscaled second image (step S206). Specifically, the depth generating module 162 directly calculates disparity of each pixel in the first image and the corresponding pixel in the upscaled second image and estimates the depth of each pixel according to the focal lengths of the first camera 12 and the second camera 14 taking the first image and the second image, the baseline distance between the first camera 12 and the second camera 14, and the disparity of each pixel. Here, the depth generating module 162 calculates the displacement of each pixel in the first image and the corresponding pixel in the upscaled second image according to the location of each pixel in the first image and the upscaled second image to serve as the disparity.

The depth map generated by the depth generating module 160 is transmitted to the image reconstructing module 163, and the image reconstructing module 163 re-projects the first image with reference to the depth map, so as to reconstruct a reference image of the second image (step S208). Specifically, the image reconstructing module 163 obtains disparity information between the first image and the reference image of the second image with reference to the depth information in the depth map and a baseline distance between the first camera 12 and the second camera 14 and thereby re-projects the first image in a three-dimensional space with the disparity information, so as to reconstruct the reference image of the second image. As such, the high-resolution image captured by the second camera 14 can be simulated.

It should be mentioned that, in the present embodiment, the image reconstructing module 163 reconstructs the reference image of the second image with reference to the depth map generated by the depth generating module 162. However, in another embodiment, the image reconstructing module 163 may also reconstruct the reference image of the second image with reference to a disparity map generated by a disparity generating module (not shown). Here, the disparity generating module may calculates the disparity of each pixel in the first image and the corresponding pixel in the upscaled second image (i.e., the displacement of each pixel in the first image and the upscaled second image), so as to generate the disparity map.

The occlusion region detecting module 164 then detects an occlusion region in the reference image, and the occlusion region compensating module 165 compensates the occlusion region by using the upscaled second image (step S210). In an embodiment of the invention, the region occupied by the reference image is the same as the region occupied by the upscaled second image; therefore, the occlusion region can be found through comparing the reference image and the upscaled second image. Thereby, the occlusion region detecting module 164 matches the reference image with the upscaled second image and takes a region in the reference image not matched with the upscaled second image as the occlusion region. According to another embodiment, since the reference image is obtained by reprojecting the first image; hence, an occlusion region in the first image will be blank in the reconstructed image. As such, the occlusion region detecting module 164 may directly detect a blank region in the reference image and take the blank region as the occlusion region. The occlusion region compensating module 165 directly compensates the occlusion region with use of the image of a region corresponding to the occlusion region in the upscaled second image and finally generates the high-resolution reference image of the second image.

Figure 3A:
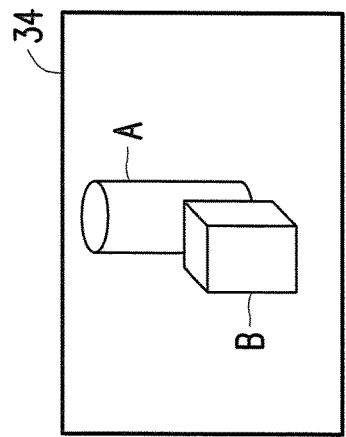
FIG. 3A to FIG. 3D respectively illustrate examples of an occlusion region according to an embodiment of the invention.
Figure 3B:
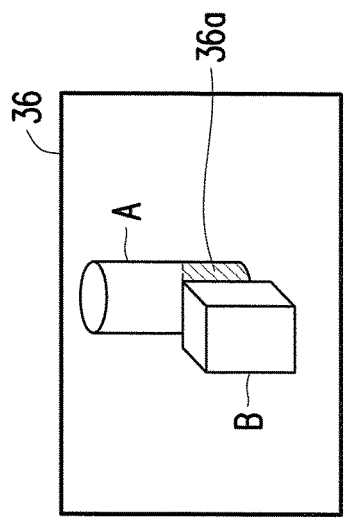
Figure 3C:
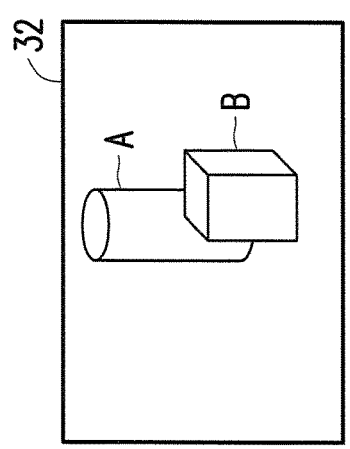
Figure 3D:
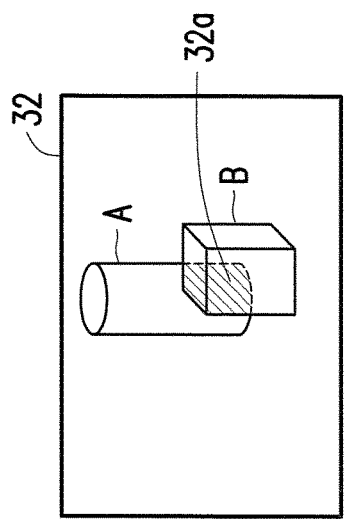

For instance, FIG. 3A to FIG. 3D respectively illustrate examples of an occlusion region according to an embodiment of the invention. FIG. 3A and FIG. 3B respectively illustrate an image 32 captured by a left camera (predetermined to have high resolution) and an image 34 generated by upscaling an image captured by a right camera (predetermined to have low resolution) of an electronic apparatus. Here, the resolution of the upscaled image 34 is the same as that of the image 32. According to the comparison result between the relative locations of an object A and an object B in FIG. 3A and FIG. 3B, the left camera located on the left side can capture an image at a left-ish view angle, and the right camera located on the right side can capture an image at a right-ish view angle. Here, if the image 32 is taken as the high-resolution first image in aforesaid embodiment, when the electronic apparatus reconstructs the reference image 36 of the image 34 based on the image 32, since the lower-right region 32a (as shown in FIG. 3C) of the object A in the image 32 is occluded by the object B, the image of a region 36a that is overlapped with the region 32a cannot be reconstructed in the reference image 36. At this time, the electronic apparatus may compensate the region 36a with use of image data of a region corresponding to the region 36a in the image 34 and finally generate the high-resolution reference image.

Returning back to the steps shown in FIG. 2, after the occlusion region is compensated, the stereo image generating module 166 may generate a stereo image including the first image captured by the first camera 12 and the reference image compensated by the occlusion region compensating module 165 (step S212).

Through aforesaid method, the electronic apparatus provided in the present embodiment is able to generate the stereo image having high-resolution left-eye and right-eye images with use of one low-resolution camera.

It should be mentioned that the space available for accommodating the camera in the electronic apparatus may be restricted because of the small size, the complex component arrangement, and so on. Hence, in a normal mobile phone with the dual-lens camera, the distance between the lenses is merely 1-2 cm, which is quite different from the distance (i.e. 7.7 cm) between two eyes of normal people. Such difference results in the insufficient disparity of the stereo image captured by the electronic apparatus, and hence the user observing the stereo image may be dissatisfied with the resultant stereo effects. To compensate the difference, the invention provides a method of adaptively adjusting the disparity between the first image and the reconstructed image of the second image based on said arrangement of the low-resolution camera and the high-resolution camera.

Figure 4:
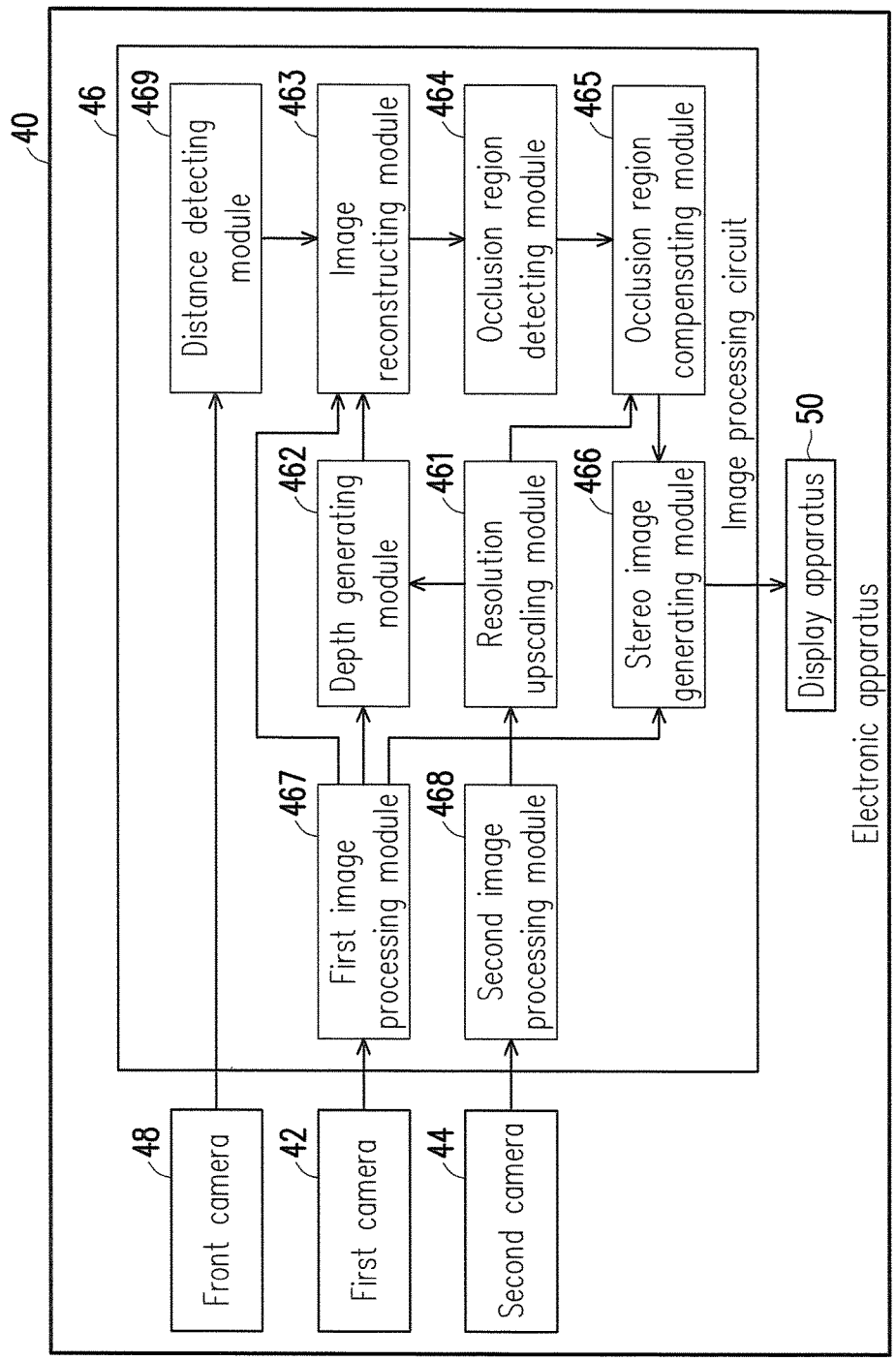
FIG. 4 is a block diagram showing the electronic apparatus according to an embodiment of the invention.

In particular, FIG. 4 is a block diagram showing an electronic apparatus according to an embodiment of the invention. With reference to FIG. 4, the electronic apparatus 40 provided in the present embodiment is, for instance, a digital camera, a DVC, or a portable electronic apparatus capable of performing an image taking function, such as a mobile phone, or a tablet PC. The electronic apparatus 40 includes a first camera 42, a second camera 44, an image processing circuit 46, a front camera 48, and a display apparatus 50. The first camera 42 and the second camera 44 are identical or similar to the first camera 12 and the second camera 14 provided in the embodiment shown in FIG. 1 and thus will not be further described.

Different from the embodiment depicted in FIG. 1, the electronic apparatus 40 in the present embodiment additionally includes the front camera 48 and the display apparatus 50. The front camera 48 is arranged on the front surface of the electronic apparatus 40 (i.e. opposite to a back surface of the electronic apparatus 40 where the first camera 42 and the second camera 44 are disposed), for instance, so as to capture the image of the user 40 of the electronic apparatus 40. The display apparatus 50 is, for instance, a liquid crystal display (LCD), a light-emitting diode (LED) display, or any other display that can display the stereo images captured by the electronic apparatus 40 and may be combined with a touch panel to form a touch screen, such that the user is allowed to operate the electronic apparatus 40 through performing touch actions while the captured images are being displayed.

The image processing circuit 46 provided herein includes a resolution upscaling module 461, a depth generating module 462, an image reconstructing module 463, an occlusion region detecting module 464, an occlusion region compensating module 465, a stereo image generating module 466, a first image processing module 467, a second image processing module 468, and an eye distance detecting module 469. Here, the functions of the resolution upscaling module 461, the depth generating module 462, the image reconstructing module 463, the occlusion region detecting module 464, the occlusion region compensating module 465, and the stereo image generating module 466 are identical or similar to the functions of the resolution upscaling module 161, the depth generating module 162, the image reconstructing module 163, the occlusion region detecting module 164, the occlusion region compensating module 165, and the stereo image generating module 166 provided in the previous embodiment and thus will not be further explained hereinafter.

The difference between the embodiment depicted in FIG. 1 and the present embodiment lies in that the image processing circuit 46 provided herein includes the first image processing module 467, the second image processing module 468, and the eye distance detecting module 469. The first image processing module 467 and the second image processing module 468 process image signals of the images captured by the first camera 42 and the second camera 44, for instance, so as to obtain the first image and the second image. The first image processing module 467 and the second image processing module 468 may further adjust the brightness, the contrast, the color temperature, the white balance, the sharpness, or the vividness of the images or remove noise, such that the processed images can be applied to generate the stereo image subsequently. The eye distance detecting module 469 receives the image of the user captured by the front camera 48 and calculates the distance between two eyes of the user through image processing such as face recognition, or eyeball recognition. The distance calculated by the eye distance detecting module 469 is transmitted to the image reconstructing module 463 and serves as a reference for reconstructing the reference image of the second image.

Figure 5:
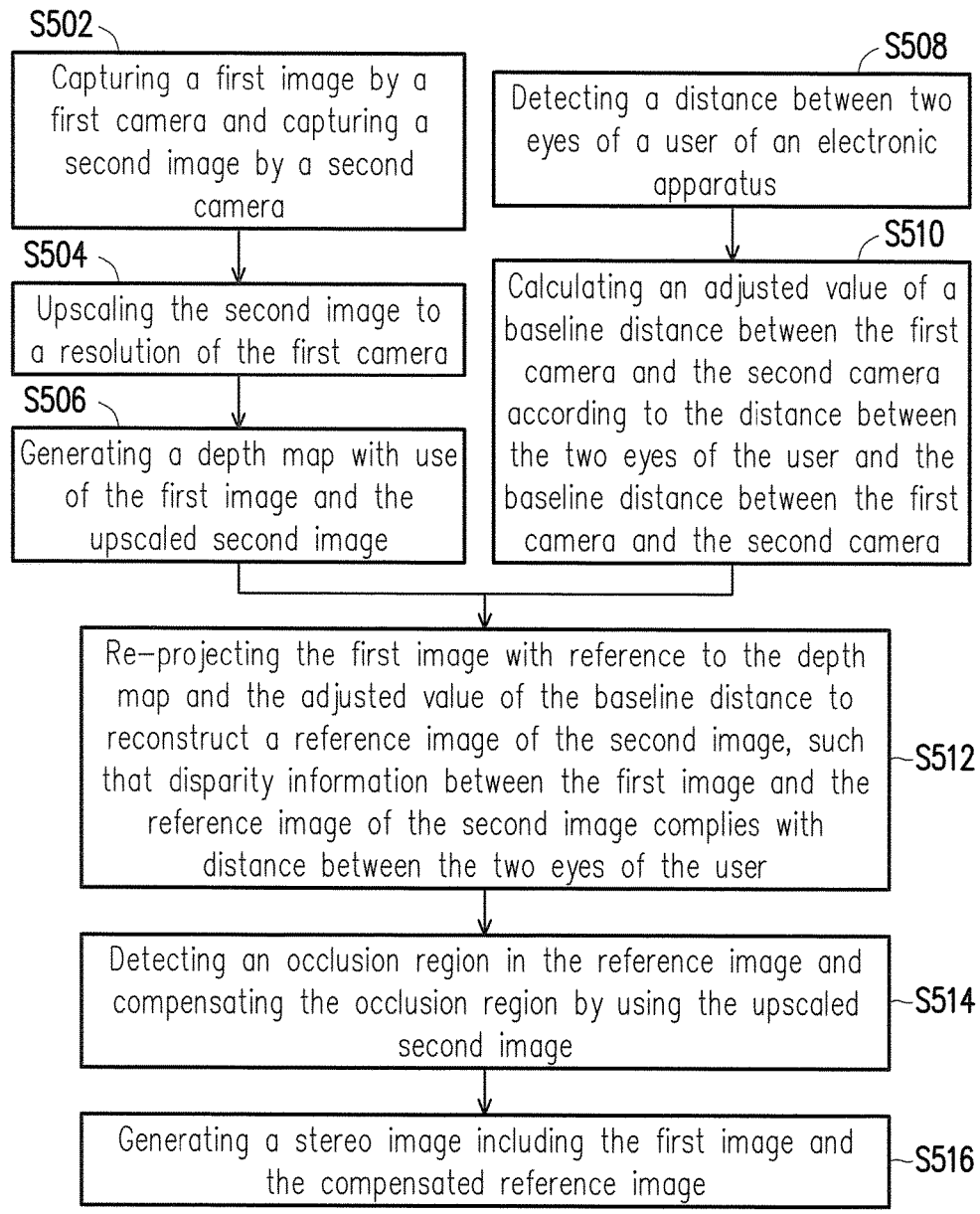
FIG. 5 is a flowchart illustrating a stereo image generating method of an electronic apparatus according to an embodiment of the invention.

Specifically, FIG. 5 is a flowchart illustrating a stereo image generating method of an electronic apparatus according to an embodiment of the invention. With reference to FIG. 4 and FIG. 5, the method provided in the present embodiment is adapted to the electronic apparatus 40 depicted in FIG. 4. Detailed steps of the stereo image generating method provided in this embodiment are explained below with reference to the components in the electronic apparatus 40 shown in FIG. 4.

A first image is captured by the first camera 42, and a second image is captured by the second camera 44 (step S502). The second image captured by the second camera 44 is upscaled by the resolution upscaling module 461 to the resolution of the first camera 42 (step S504), and the depth generating module 462 generates a depth map with use of the first image and the upscaled second image (step S506). Steps S502 to S506 are the same as or similar to the steps S202 to S206 provided in the previous embodiment; hence, these steps are not further explained hereinafter.

The differences between the embodiment depicted in FIG. 1 and the present embodiment lie in that the front camera 48 is also applied to take the image of the user while the first camera 42 and the second camera 44 are capturing images, and the eye distance detecting module 469 analyzes the image of the user and detects the distance between the two eyes of the user of the electronic apparatus 40 (step S508). The distance between the two eyes of the user is sent to the image reconstructing module 463, and the image reconstructing module 463 calculates an adjusted value of the baseline distance between the first camera 42 and the second camera 44 according to the distance between the two eyes of the user and the baseline distance between the first camera 42 and the second camera 44. For instance, if the baseline distance between the first camera 42 and the second camera 44 is 1.5 cm, and the detected distance between the two eyes of the user is 6.5 cm, the adjusted value of the baseline distance is 5 cm.

The image reconstructing module 463 then re-projects the first image with reference to the depth map generated by the depth generating module 462 and the adjusted value of the baseline distance to reconstruct the reference image of the second image, such that the disparity information between the first image and the reference image of the second image complies with the distance between the two eyes of the user (step S512). Particularly, the image reconstructing module 463 adjusts a parallax between the first image and the second image according to the adjusted value of the baseline distance, retrieves depth information in the depth map and converts a coordinate system of the depth information into a world coordinate system, and re-projects the first image according to the converted depth information and the adjusted parallax, so as to reconstruct the reference image of the second image, for instance.

Figure 6A:
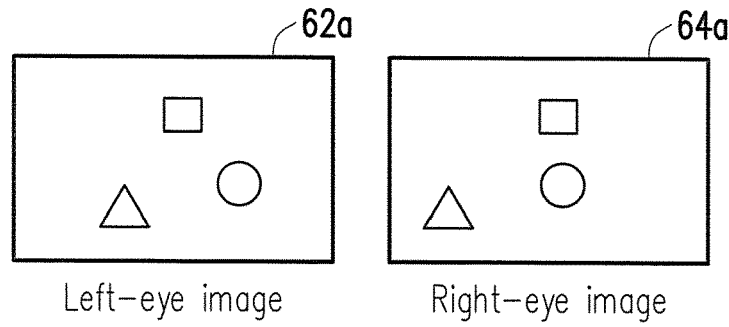
FIG. 6A and FIG. 6B illustrate examples of reconstructing a reference image according to an adjusted value of a baseline distance according to an embodiment of the invention.
Figure 6A:
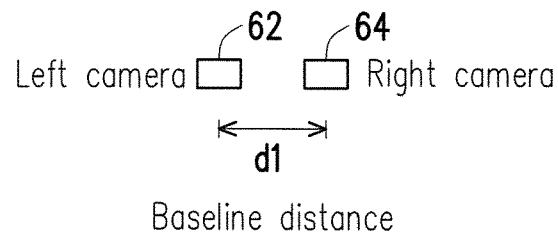
Figure 6B:
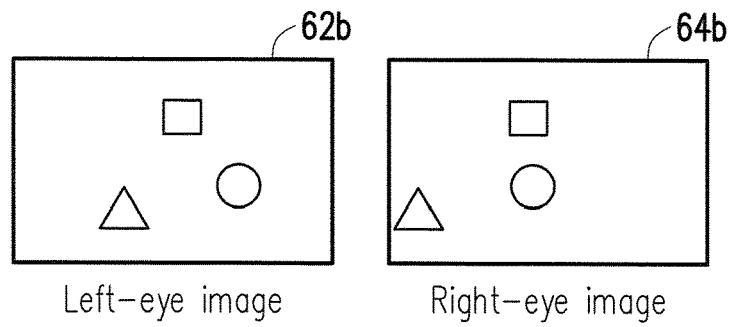
Figure 6B:
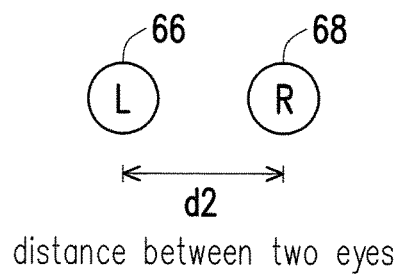

FIG. 6A and FIG. 6B illustrate examples of reconstructing a reference image according to an adjusted value of a baseline distance according to an embodiment of the invention. With reference to FIG. 6A, the baseline distance between the left camera 62 and the right camera 64 in the electronic apparatus provided in the present embodiment is d1. A left-eye image 62a is captured by the left camera 62, and a right-eye image 64a is a reference image reconstructed by applying the method provided in the previous embodiment to the image captured by the right camera 64. With reference to FIG. 4B, a distance between a left eye 66 and a right eye 68 of the user is d2. The electronic device is able to calculate an adjusted value of the baseline distance according to the baseline distance d1 and the distance d2 between the two eyes of the user and thereby adjust the reconstructed reference image. After the comparison between the left-eye image 62a and the left-eye image 62b, it can be learned that the location of the object remains unchanged; after the comparison between the right-eye image 64a and the right-eye image 64b, it can be learned that the location of the object is moved leftwards, such that the disparity between the objects is increased to comply with the distance d2 between the two eyes of the user. Note that the electronic apparatus provided herein adjusts the reconstructed right-eye image 64a merely according to the distance d2 between the two eyes of the user, and thereby the disparity between the left-eye image 62b and the right-eye image 64b complies with the distance d2 between the two eyes of the user. However, in another embodiment, the electronic apparatus provided herein may simultaneously adjust the left-eye image 62b and the right-eye image 64b or merely adjust the left-eye image 64a, such that the disparity between the adjusted left-eye image and the adjusted right-eye image complies with the distance d2 between the two eyes of the user. This should not be construed as a limitation to the invention.

Returning back to the steps shown in FIG. 5, after the image is adjusted, the occlusion region detecting module 464 detects an occlusion region in the reference image, and the occlusion region compensating module 465 compensates the occlusion region by using the upscaled second image (step S514). The stereo image generating module 466 then generates a stereo image including the first image captured by the first camera 42 and the reference image compensated by the occlusion region compensating module 465 (step S516). The stereo image may, for instance, be further transmitted to the display apparatus 50 and displayed for the user to observe. Steps S514 to S516 are the same as or similar to the steps S210 to S212 provided in the previous embodiment; hence, these steps are not further explained hereinafter.

Through aforesaid method, the user is able to observe the stereo images with favorable stereo effects on the display apparatus 50 of the electronic apparatus while the user is using the electronic apparatus to capture the stereo image.

To provide the user with the three-dimensional visual experience, the electronic apparatus displays two images with parallax (i.e., the left-eye image and the right-eye image) on the same display plane, and the objects appearing in the two images are converged at different locations relative to the display plane according to the disparity. For instance, the object with a negative parallax is displayed in front of the display plane, the object with a positive parallax is displayed on back of the display plane, and the object with a zero parallax is displayed on the display plane. Due to the parallax, the user senses the distance between the user and the objects and is thus provided with the three-dimensional visual experience. Both eyes of the user may attempt to be focuses on the display plane, whereas some objects in the image may be converged at other locations different from the display plane. Hence, the user is easily to feel dizzy.

To resolve said issue, since the user often focuses on the main object (e.g., the face of an actor in a movie) in the stereo image while observing the image, the user may be provided with a relatively comfortable viewing experience if the face of the actor appearing in the left-eye image and the right-image is adjusted to have zero parallax. As such, the invention provides the method of adjusting the generated stereo image according to the location of the main object, such that the user can observe the resultant stereo image comfortably.

Figure 7:
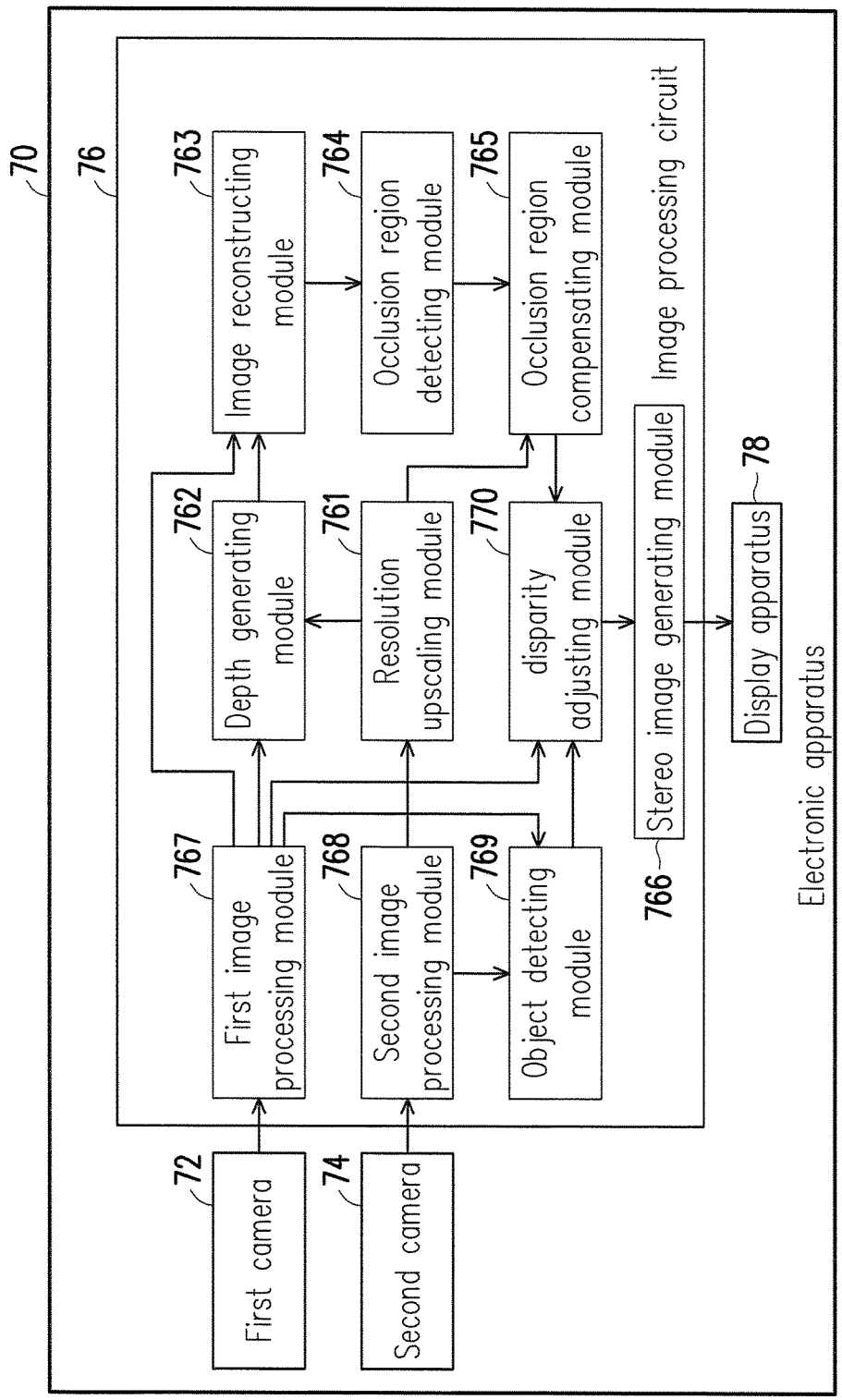
FIG. 7 is a block diagram showing the electronic apparatus according to an embodiment of the invention.

FIG. 7 is a block diagram showing an electronic apparatus according to an embodiment of the invention. With reference to FIG. 7, the electronic apparatus 70 provided in the present embodiment is, for instance, a digital camera, a DVC, or a portable electronic apparatus capable of performing an image taking function, such as a mobile phone, a tablet PC, and so on. The electronic apparatus 70 includes a first camera 72, a second camera 74, an image processing circuit 76, and a display apparatus 78. The first camera 72 and the second camera 74 are identical or similar to the first camera 12 and the second camera 14 provided in the embodiment shown in FIG. 1 and thus will not be further described.

The difference between the embodiment depicted in FIG. 1 and the present embodiment lies in that the electronic apparatus 70 provided herein includes the display apparatus 78 which may be an LCD, an LED display, or any other display that can display the stereo images captured by the electronic apparatus 70. The display apparatus 78 may also be combined with a touch panel to form a touch screen, such that the user is allowed to operate the electronic apparatus 70 through performing touch actions while the captured images are being displayed.

The image processing circuit 76 provided herein includes a resolution upscaling module 761, a depth generating module 762, an image reconstructing module 763, an occlusion region detecting module 764, an occlusion region compensating module 765, a stereo image generating module 766, a first image processing module 767, a second image processing module 768, an object detecting module 769, and a disparity adjusting module 770. Here, the functions of the resolution upscaling module 761, the depth generating module 762, the image reconstructing module 763, the occlusion region detecting module 764, the occlusion region compensating module 765, and the stereo image generating module 766 are identical or similar to the functions of the resolution upscaling module 161, the depth generating module 162, the image reconstructing module 163, the occlusion region detecting module 164, the occlusion region compensating module 165, and the stereo image generating module 166 provided in the previous embodiment and thus will not be further explained hereinafter.

The difference between the embodiment depicted in FIG. 1 and the present embodiment lies in that the image processing circuit 76 provided herein includes the first image processing module 767, the second image processing module 768, the object detecting module 769, and the disparity adjusting module 770. The first image processing module 767 and the second image processing module 768 process image signals of the images captured by the first camera 72 and the second camera 74, for instance, so as to obtain the first image and the second image. The first image processing module 767 and the second image processing module 768 may further adjust the brightness, the contrast, the color temperature, the white balance, the sharpness, or the vividness of the images or remove noise, such that the processed images can be applied to generate the stereo image subsequently. Besides, the object detecting module 769 receives the first image and the second image processed by the first image processing module 767 and the second image processing module 768, detects the main objects in the first image and the second image, and provides the detected main objects to the disparity adjusting module 770. The disparity adjusting module 770 adjusts disparity information between the first image and the reference image of the second image according to the main objects detected by the object detecting module 769, such that the main objects are concentrated onto a display plane of the electronic apparatus 70.

Figure 8:
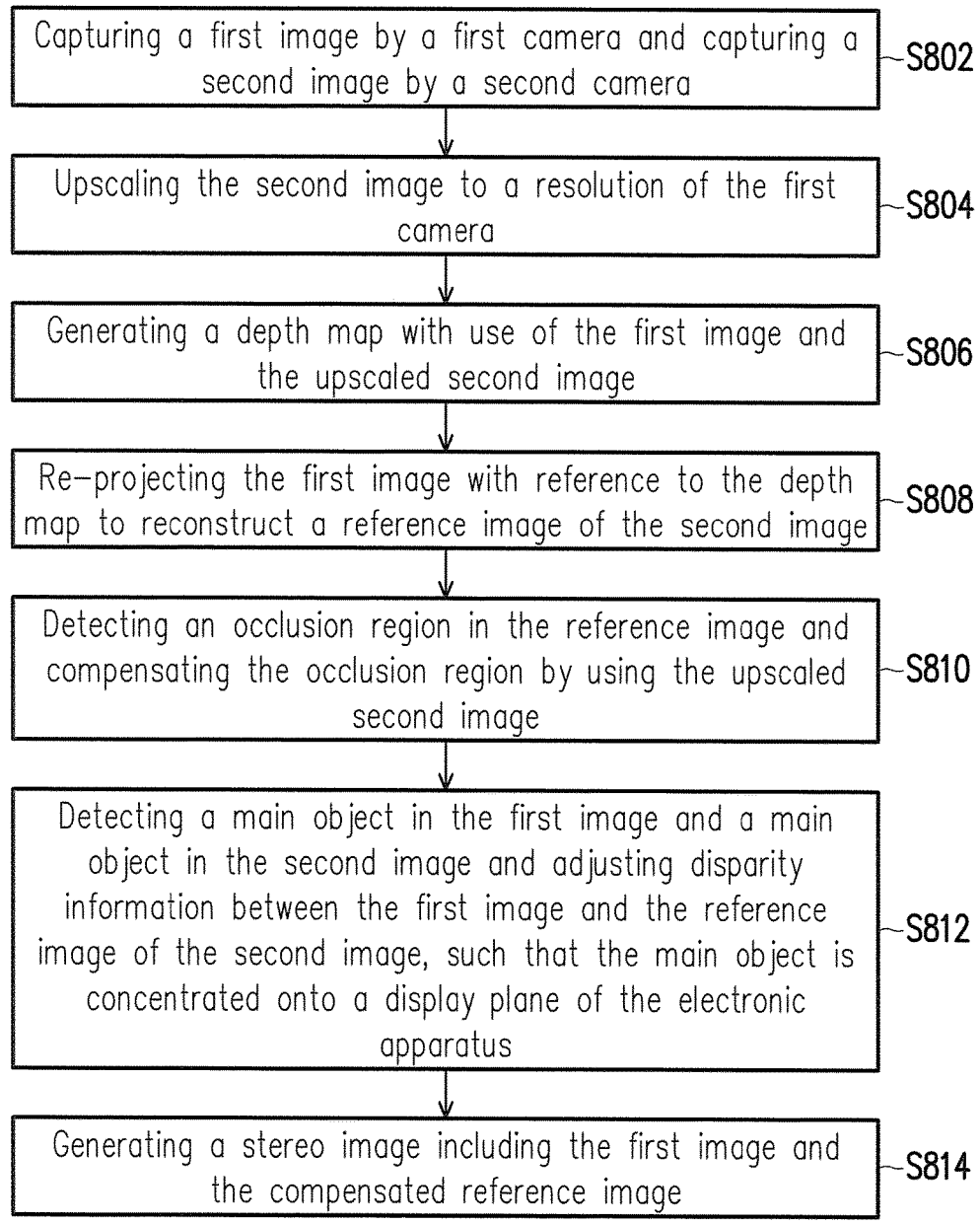
FIG. 8 is a flowchart illustrating a stereo image generating method of an electronic apparatus according to an embodiment of the invention.

Specifically, FIG. 8 is a flowchart illustrating a stereo image generating method of an electronic apparatus according to an embodiment of the invention. With reference to FIG. 7 and FIG. 8, the method provided in the present embodiment is adapted to the electronic apparatus 70 depicted in FIG. 7. Detailed steps of the stereo image generating method provided in this embodiment are explained below with reference to the components in the electronic apparatus 10 shown in FIG. 7.

The difference between the embodiment depicted in FIG. 2 and the present embodiment lies in that the method provided herein further includes a step S812. In step S812, the object detecting module 769 detects a main object in the first image and a main object in the second image, and the disparity adjusting module 770 adjusts disparity information between the first image and the reference image of the second image, such that the main objects are concentrated onto a display plane of the electronic apparatus. As such, the user is allowed to observe the resultant image comfortably.

Figure 9A:
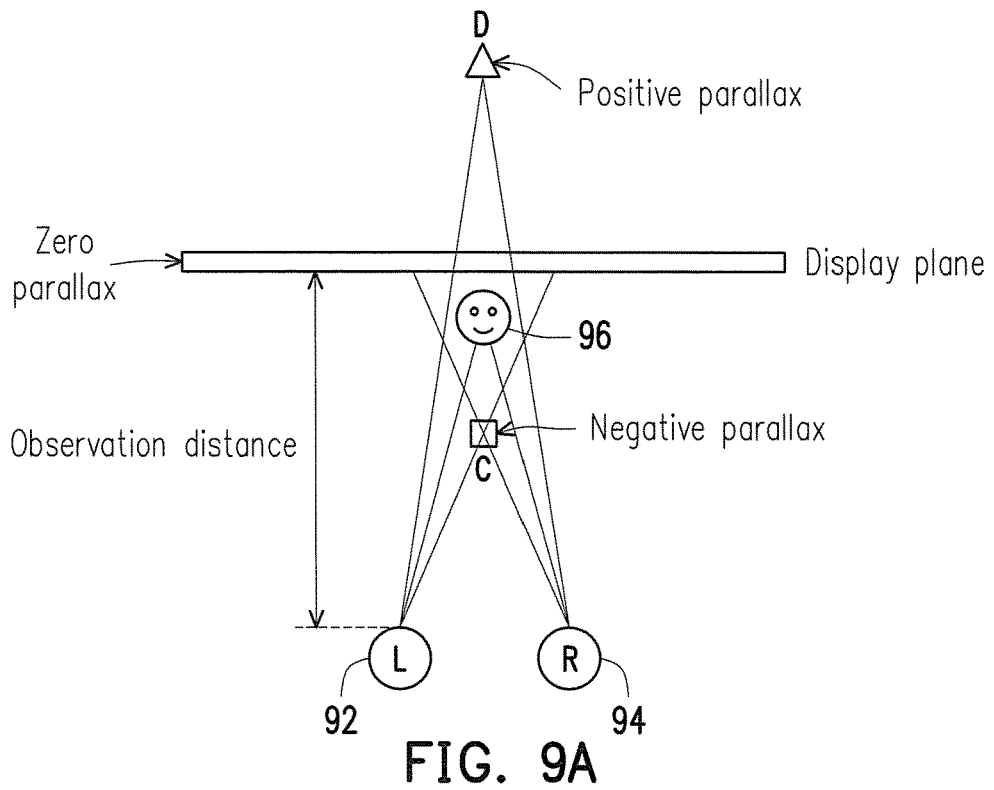
FIG. 9A and FIG. 9B illustrate examples of adjusting image disparity based on main objects according to an embodiment of the invention.
Figure 9B:
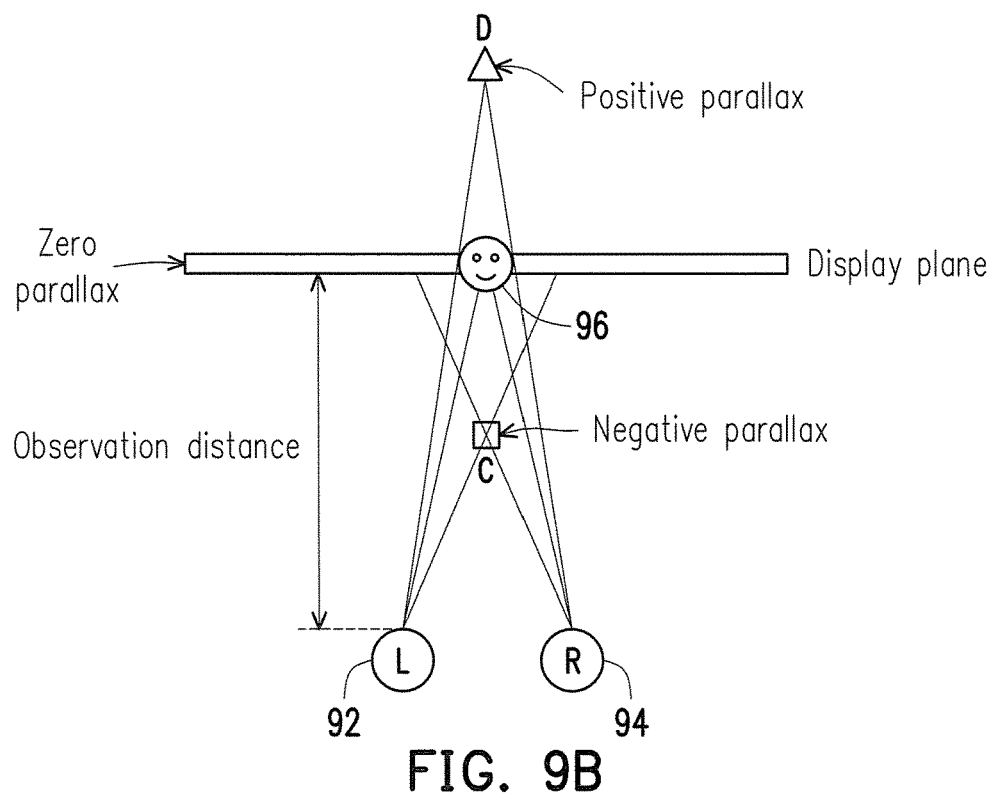

FIG. 9A and FIG. 9B illustrate examples of adjusting image disparity based on main objects according to an embodiment of the invention. Here, FIG. 9A illustrates the correlation between the display plane and the object observed by a left eye 92 and a right eye 94 of the user. The object C with the negative parallax is displayed in front of the display plane, and the object D with the positive parallax is displayed on back of the display plane. It is assumed that the object 96 is the main object in the stereo image. Since the object 96 has the negative parallax, the object 96 observed by the left eye 92 and the right eye 94 of the user in the stereo image is located in front of the display plane, such that the user may easily feel dizzy. To resolve said issue, the electronic apparatus provided in the present embodiment adjusts the disparity of the left-eye and right-eye images in the stereo image, such that the object 96 has a zero parallax. With reference to FIG. 9B, after the disparity of the stereo image is adjusted, the object 96 observed by the left eye 92 and the right eye 94 of the user in the stereo image is located on the display plane, such that the user is allowed to observe the image comfortably.

To sum up, in the stereo image generating method and the electronic apparatus utilizing the method, the high-resolution camera and the low-resolution camera are collectively employed. The image captured by the high-resolution camera is applied to reconstruct the image captured by the low-resolution camera, and the occlusion region in the reconstructed image is compensated with use of the low-resolution image captured by the low-resolution camera. Thereby, the high-resolution stereo image can be generated. In the invention, the distance between two eyes of the user and the depth information of the main objects in the images can be further applied to adjust the disparity of the images, so as to generate the stereo image that can achieve favorable stereo effects and can be observed comfortably.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. A stereo image generating method adapted to an electronic apparatus comprising a first camera and a second camera, the first camera and the second camera being capable of capturing stereo images, a resolution of the first camera being larger than a resolution of the second camera, the stereo image generating method comprising:

capturing a first image by the first camera and capturing a second image by the second camera;

upscaling the second image to the resolution of the first camera;

generating a depth map with use of the first image and the upscaled second image;

re-projecting the first image with reference to the depth map to reconstruct a reference image of the second image, comprising:

detecting a distance between two eyes of a user of the electronic apparatus;

calculating an adjusted value of a baseline distance between the first camera and the second camera according to the distance between the two eyes of the user and the baseline distance between the first camera and the second camera; and re-projecting the first image with reference to the depth map and the adjusted value of the baseline distance to reconstruct the reference image of the second image, to enable disparity information between the first image and the reference image of the second image to comply with the distance between the two eyes of the user;

detecting an occlusion region in the reference image and compensating the occlusion region by using the upscaled second image; and generating a stereo image including the first image and the compensated reference image.

2. The stereo image generating method according to claim 1, wherein the step of re-projecting the first image with reference to the depth map to reconstruct the reference image of the second image further comprises:

obtaining the disparity information between the first image and the reference image of the second image with reference to depth information in the depth map and the baseline distance between the first camera and the second camera; and re-projecting the first image in a three-dimensional space with the disparity information to reconstruct the reference image of the second image.

3. The stereo image generating method according to claim 1, wherein the step of re-projecting the first image with reference to the depth map and the adjusted value of the baseline distance to reconstruct the reference image of the second image comprises:

adjusting a parallax between the first image and the second image according to the adjusted value of the baseline distance;

retrieving depth information in the depth map and converting a coordinate system of a coordinate of the depth information into a world coordinate system; and re-projecting the first image with reference to the depth map according to the converted depth information and the adjusted parallax to reconstruct the reference image of the second image.

4. The stereo image generating method according to claim 1, wherein the step of detecting the occlusion region in the reference image comprises:

matching the reference image with the upscaled second image; and taking a region of the reference image not matched with the upscaled second image as the occlusion region.

5. The stereo image generating method according to claim 1, wherein the step of detecting the occlusion region in the reference image comprises:

detecting a blank region in the reference image and taking the blank region as the occlusion region.

6. The stereo image generating method according to claim 1, wherein after detecting the occlusion region in the reference image and compensating the occlusion region by using the upscaled second image, the method further comprises:

detecting main objects respectively in the first image and in the second image; and adjusting the disparity information between the first image and the reference image of the second image to enable the main objects to be concentrated onto a display plane of the electronic apparatus.

7. An electronic device comprising:

a first camera and a second camera respectively capturing one of left-eye and right-eye images required for generating a stereo image, wherein a resolution of the first camera is greater than a resolution of the second camera;

an eye distance detecting module, detecting a distance between two eyes of a user of the electronic apparatus; and an image processing circuit coupled to the first camera and the second camera, processing a first image and a second image respectively captured by the first camera and the second camera, the image processing circuit comprising:

a resolution upscaling module, upscaling the second image to the resolution of the first camera;

a depth generating module, generating a depth map with use of the first image and the upscaled second image;

an image reconstructing module, calculating an adjusted value of a baseline distance between the first camera and the second camera according to the distance between the two eyes of the user and the baseline distance between the first camera and the second camera and re-projecting the first image with reference to the depth map and the adjusted value of the baseline distance to reconstruct a reference image of the second image, to enable disparity information between the first image and the reference image of the second image to comply with the distance between the two eyes of the user;

an occlusion region detecting module, detecting an occlusion region in the reference image;

an occlusion region compensating module, compensating the occlusion region by using the upscaled second image; and a stereo image generating module, generating the stereo image including the first image and the compensated reference image.

8. The electronic apparatus according to claim 7, wherein the image reconstructing module obtains the disparity information between the first image and the reference image of the second image with reference to depth information in the depth map and the baseline distance between the first camera and the second camera and re-projects the first image in a three-dimensional space with the disparity information to reconstruct the reference image of the second image.

9. The electronic apparatus according to claim 7, wherein the image reconstructing module further adjusts a parallax between the first image and the second image according to the adjusted value of the baseline distance, retrieves depth information in the depth map and converts a coordinate system of a coordinate of the depth information into a world coordinate system, and re-projects the first image according to the converted depth information and the adjusted parallax to reconstruct the reference image of the second image.

10. The electronic apparatus according to claim 7, wherein the occlusion region detecting module matches the reference image with the upscaled second image and takes a region of the reference image not matched with the upscaled second image as the occlusion region.

11. The electronic apparatus according to claim 7, wherein the occlusion region detecting module detects a blank region in the reference image and takes the blank region as the occlusion region.

12. The electronic apparatus according to claim 7, wherein the image processing circuit further comprises:
- an object detecting module, detecting main objects respectively in the first image and in the second image; and
  - a disparity adjusting module, adjusting the disparity information between the first image and the reference image of the second image to enable the main objects to be concentrated onto a display plane of the electronic apparatus.

* * * * *